US006498872B2

(12) United States Patent
Bouevitch et al.

(10) Patent No.: US 6,498,872 B2
(45) Date of Patent: Dec. 24, 2002

(54) OPTICAL CONFIGURATION FOR A DYNAMIC GAIN EQUALIZER AND A CONFIGURABLE ADD/DROP MULTIPLEXER

(75) Inventors: Oleg Bouevitch, Gloucester (CA); Thomas Ducellier, Ottawa (CA); W. John Tomlinson, Princeton, NJ (US); Paul Colbourne, Nepean (CA); Jacques Bismuth, Ottawa (CA)

(73) Assignee: JDS Uniphase Inc., Ottawa (CA)

( * ) Notice: Subject to any disclaimer, the term of this patent is extended or adjusted under 35 U.S.C. 154(b) by 17 days.

(21) Appl. No.: 09/729,270

(22) Filed: Dec. 5, 2000

(65) Prior Publication Data

US 2002/0009257 A1 Jan. 24, 2002

Related U.S. Application Data

(60) Provisional application No. 60/183,155, filed on Feb. 17, 2000.

(51) Int. Cl.[7] .............................. G02B 6/28; H04J 14/02
(52) U.S. Cl. .......................... 385/24; 385/37; 359/130; 359/246; 359/247; 359/301; 359/302; 359/128
(58) Field of Search ................................. 349/193, 196; 359/115, 122, 128, 124, 130, 131, 245–247, 301–302; 385/16, 18, 24, 31, 37, 39, 47

(56) References Cited

U.S. PATENT DOCUMENTS

| 4,367,040 A | 1/1983 | Goto .......................... 356/44 |
| 4,707,056 A | 11/1987 | Bittner ..................... 350/96.12 |
| 4,839,884 A | 6/1989 | Schloss ......................... 370/3 |
| 5,233,405 A | 8/1993 | Wildnauer et al. ........... 356/333 |
| 5,311,606 A * | 5/1994 | Asakura et al. ......... 359/337.21 |
| 5,414,540 A * | 5/1995 | Patel et al. .................. 349/196 |
| 5,477,350 A | 12/1995 | Riza et al. .................... 359/39 |
| 5,526,155 A | 6/1996 | Knox et al. .................. 359/130 |
| 5,740,288 A | 4/1998 | Pan ............................... 385/11 |
| 5,745,271 A | 4/1998 | Ford et al. ................... 359/130 |
| 5,847,831 A | 12/1998 | Tomlinson, III et al. ..... 356/364 |
| 5,867,264 A | 2/1999 | Hinnrichs .................... 356/310 |
| 5,881,199 A | 3/1999 | Li ............................... 385/140 |
| 5,936,752 A | 8/1999 | Bishop et al. ............... 359/124 |
| 5,943,158 A | 8/1999 | Ford et al. ................... 359/295 |
| 5,960,133 A | 9/1999 | Tomlinson ..................... 385/18 |
| 6,018,603 A | 1/2000 | Lundgren et al. ............. 385/33 |
| 6,081,331 A | 6/2000 | Teichmann .................. 356/328 |
| 6,134,359 A | 10/2000 | Keyworth et al. ............. 385/33 |
| 6,415,080 B1 * | 7/2002 | Sappey et al. ............... 359/127 |

* cited by examiner

Primary Examiner—Hemang Sanghavi
Assistant Examiner—Omar Rojas
(74) Attorney, Agent, or Firm—Lacasse & Associates, LLC

(57) ABSTRACT

An optical device for rerouting and modifying an optical signal that is capable of operating as a dynamic gain equalizer (DGE) and/or a configurable optical add/drop multiplexer (COADM) is disclosed. The optical design includes a front-end unit for providing a collimated beam of light, an element having optical power for providing collimating/focusing effects, a diffraction element for providing spatial dispersion, and modifying means which in a preferred embodiment includes one of a MEMS array and a liquid crystal array for reflecting and modifying at least a portion of a beam of light. The modifying means functions as an attenuator when the optical device operates as a DGE and as a switching array when the optical device operates as a COADM. Advantageously, this invention provides a 4-f system wherein a preferred embodiment the element having optical power is a concave reflector for providing a single means for receiving light from the front-end unit, reflecting the received light to the dispersive element, receiving light from the dispersive element, and providing dispersed light to the modifying means. Conveniently and advantageously, this same concave reflector is utilized on a return path, obviating the requirement of matching elements. In one embodiment a single focussing/collimating lens is provided substantially at a focal plane of the element having optical power.

41 Claims, 12 Drawing Sheets

OPTICAL CONFIGURATION FOR A DYNAMIC GAIN EQUALIZER AND A CONFIGURABLE ADD/DROP MULTIPLEXER

This application claims the benefit of Ser. No. 60/183,155, filed Feb. 17, 2000.

FIELD OF THE INVENTION

The present invention relates to an optical device for rerouting and modifying an optical signal, or more specifically, to an optical configuration including a diffraction grating that can be used for a dynamic gain equalizer and/or a configurable add/drop multiplexer.

BACKGROUND OF THE INVENTION

In optical wavelength division multiplexed (WDM) communication systems, an optical waveguide simultaneously carries many different communication channels in light of different wavelengths. In WDM systems it is desirable to ensure that all channels have nearly equivalent power. To help achieve this, gain equalizers are disposed at various points throughout the system to control the relative power levels in respective channels. Dense WDM systems require special add/drop multiplexers (ADM) to add and drop particular channels (i.e., wavelengths). For example, at predetermined nodes in the system, optical signals of pre-determined wavelength are dropped from the optical waveguide and others are added.

Typically, gain equalizing and add/drop multiplexer devices involve some form of multiplexing and demultiplexing to modify each individual channel of the telecommunication signal. In particular, it is common to provide a first diffraction grating for demultiplexing the optical signal and a second spatially separated diffraction grating for multiplexing the optical signal after it has been modified. An example of the latter is disclosed in U.S. Pat. No. 5,414,540, incorporated herein by reference. However, in such instances it is necessary to provide and accurately align two matching diffraction gratings and at least two matching lenses. This is a significant limitation of prior art devices.

To overcome this limitation, other prior art devices have opted to provide a single diffraction grating that is used to demultiplex an optical signal in a first pass through the optics and multiplex the optical signal in a second pass through the optics. For example, U.S. Pat. Nos. 5,233,405, 5,526,155, 5,745,271, 5,936,752 and 5,960,133, which are incorporated herein by reference, disclose such devices.

However, none of these prior art devices disclose an optical arrangement suitable for both dynamic gain equalizer (DGE) and configurable optical add/drop multiplexer (COADM) applications. In particular, none of these prior art devices recognize the advantages of providing a simple, symmetrical optical arrangement suitable for use with various switching/attenuating means.

Moreover, none of the prior art devices disclose a multiplexing/demultiplexing optical arrangement that is compact and compatible with a plurality of parallel input/output optical waveguides.

For example, U.S. Pat. No. 5,414,540 to Patel et al. discloses a liquid crystal optical switch for switching an input optical signal to selected output channels. The switch includes a diffraction grating, a liquid crystal modulator, and a polarization dispersive element. In one embodiment, Patel et al. suggest extending the 1×2 switch to a 2×2 drop-add circuit and using a reflector. However, the disclosed device is limited in that the add/drop beams of light are angularly displaced relative to the input/output beams of light. This angular displacement is disadvantageous with respect to coupling the add/drop and/or input/output beams of light into parallel optical waveguides, in addition to the additional angular alignment required for the input beam of light.

With respect to compactness, prior art devices have been limited to an excessively long and linear configurations, wherein the input beam of light passes through each optical component sequentially before being reflected in a substantially backwards direction. U.S. Pat. No. 6,081,331 discloses an optical device that uses a concave mirror for multiple reflections as an alternative to using two lenses or a double pass through one lens. However, the device disclosed therein only accommodates a single pass through the diffraction grating and does not realize the advantages of the instant invention.

It is an object of this invention to provide an optical system including a diffraction grating that is relatively compact.

It is a further object of the instant invention to provide an optical configuration for rerouting and modifying an optical signal that can be used as a dynamic gain equalizer and/or configurable add/drop multiplexer.

SUMMARY OF THE INVENTION

The instant invention provides a 4-f optical system comprising a dispersive element for spatially separating an input optical signal into different spectral channels and a modifying array for selectively modifying each of the different spectral channels. At least one element having optical power, such as a lens or a spherical mirror, provides optical communication between the dispersive element and the modifying array.

Conveniently and advantageously, the dispersive element and the modifying array are disposed substantially at a focal plane of the at least one element having optical power. Moreover, the dispersive element and element having optical power are used in a first and a second pass through the optics, thus obviating the requirement of providing matching elements.

In accordance with the instant invention there is provided an optical device comprising: a first port for launching a beam of light; first redirecting means disposed substantially one focal length away from the first port for receiving the beam of light, the first redirecting means having optical power; a dispersive element disposed substantially one focal length away from the first redirecting means for dispersing the beam of light into a plurality of sub-beams of light; second redirecting means disposed substantially one focal length away from the dispersive element for receiving the dispersed beam of light, the second redirecting means having optical power; and, modifying means optically disposed substantially one focal length away from the second redirecting means for selectively modifying each sub-beam of light and for reflecting each of the modified sub-beams back to the second redirecting means, wherein each sub-beam of light is incident on and reflected from the modifying means along substantially parallel optical paths.

In accordance with the instant invention there is provided an optical device for rerouting and modifying an optical signal comprising: a first port for launching a beam of light; a concave reflector having a focal plane for receiving a beam of light launched from the first port; a dispersive element disposed substantially at the focal plane for spatially dispersing a beam of light reflected by the concave reflector and for redirecting a spatially dispersed beam of light back to the concave reflector; and modifying means disposed substantially at the focal plane for modifying the spatially dispersed beam of light reflected by the concave reflector and for reflecting the modified spatially dispersed beam of light back to one of the first port and a second port via the concave reflector and the dispersive element.

In accordance with the instant invention there is further provided a method of rerouting and modifying an optical signal comprising the steps of: launching a beam of light towards an element having optical power off an optical axis thereof; redirecting the beam of light incident on the element having optical power to a dispersive element disposed substantially one focal length away from the element having optical power; spatially dispersing the redirected beam of light into a plurality of different sub-beams of light corresponding to a plurality of different spectral channels with a dispersive element disposed substantially one focal length away from the element having optical power; redirecting the plurality of different sub-beams of light to a modifying means optically disposed substantially two focal lengths away from the dispersive element; selectively modifying the plurality of different sub-beams of light and reflecting them in a substantially backwards direction; and redirecting the selectively modified plurality of different sub-beams to the dispersive element and combining them to form a single output beam of light, wherein the plurality of different sub-beams of light and the selectively modified plurality of different sub-beams follow substantially parallel optical paths to and from the modifying means, respectively.

In accordance with the instant invention there is provided an optical device for rerouting and modifying an optical signal comprising: a lens including a first end having a single port coincident with an optical axis thereof and a second end having two ports disposed off the optical axis; an element having optical power disposed about one focal length away from the lens for receiving a beam of light launched from the single port; a dispersive element disposed about one focal length away from the element having optical power for spatially dispersing a beam of light received therefrom; and modifying means optically disposed about two focal lengths away from the dispersive element for modifying and reflecting a beam of light spatially dispersed by the dispersive element, wherein said one focal length is a focal length of the element having optical power.

In accordance with the instant invention there is provided a method of modifying and rerouting a beam of light comprising the steps of: launching the beam of light through a first port disposed about a first end of a lens off the optical axis of the lens, the beam of light launched in a direction parallel to the optical axis; allowing the beam of light to pass through the lens to a single port disposed about an opposite side of the lens coincident with the optical axis, and allowing the beam of light to exit the single port at a first predetermined angle to the optical axis; modifying the beam of light and reflecting the modified beam of light back to the single port at a second predetermined angle to the optical axis; and, allowing the modified beam of light to pass through the lens to a second port disposed about the first end of the lens, the second port disposed off the optical axis and spatially separated from the first port.

BRIEF DESCRIPTION OF THE DRAWINGS

Exemplary embodiments of the invention will now be described in conjunction with the drawings in which.

DETAILED DESCRIPTION

Figure 1:
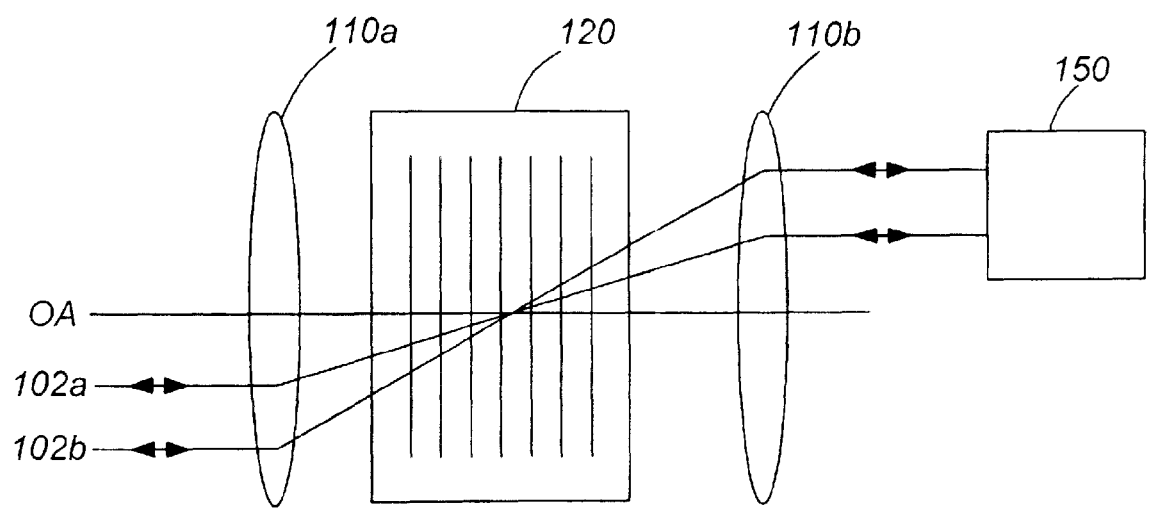
FIG. 1 is a schematic diagram illustrating an embodiment of an optical configuration that can be used as a dynamic gain equalizer and/or add-drop multiplexer (DGE/COADM) in accordance with the invention.

Referring now to FIG. 1, an optical device for rerouting and modifying an optical signal in accordance with the instant invention is shown that is capable of operating as a Dynamic Gain/Channel Equalizer (DGE) and/or a Configurable Optical Add/Drop Multiplexer (COADM).

The optical design includes a diffraction element 120 disposed between and at a focal plane of identical elements 110a and 110b having optical power, respectively. Two ports 102a and 102b are shown at an input/output end with bi-directional arrows indicating that light launched into port 102a can be transmitted through the optical device and can be reflected backward to the input port from which it was launched 102a, or alternatively, can be switched to port 102b or vice versa in a controlled manner. The input/output ports 102a and 102b are also disposed about one focal plane away from the element having optical power 110a to which they are optically coupled. Although only two input/output ports are shown to facilitate an understanding of this device, a plurality of such pairs of ports is optionally provided. At the other end of the device, modifying means 150 for modifying at least a portion of the light incident thereon is provided about the focal plane of the element having optical power 110b.

Figure 2A:
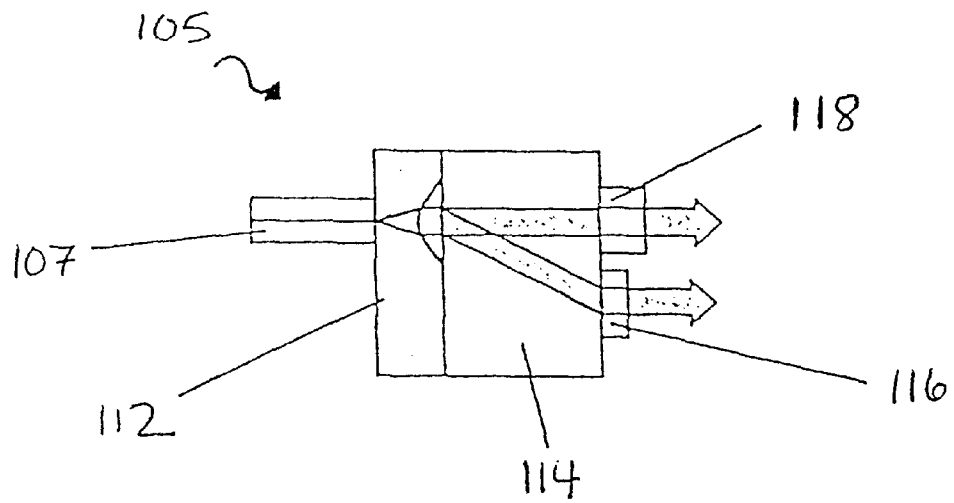
FIG. 2a is a detailed side view of a front-end module for use with the DGE/COADM shown in FIG. 1 having means for compensating for polarization mode dispersion (PMD)
Figure 2B:
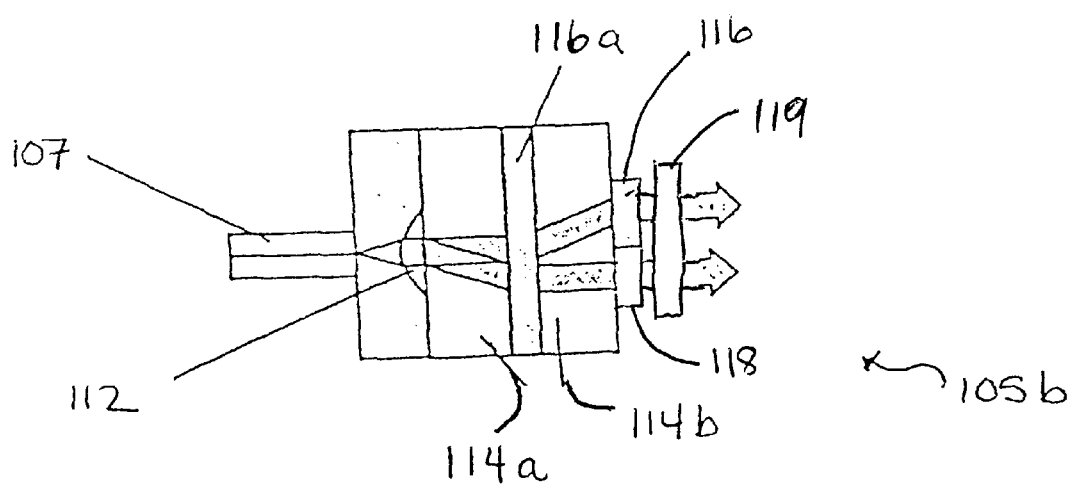
FIG. 2b is a detailed side view of an alternative front-end module having means for reducing or substantially eliminating PMD.

Since the modifying means and/or dispersive element are generally dependent upon polarization of the incident light beam, light having a known polarization state is provided to obtain the selected switching and/or attenuation. FIGS. 2a and 2b illustrate two different embodiments of polarization diversity arrangements for providing light having a known polarization state, for use with the DGE/COADM devices described herein. The polarization diversity arrangement, which is optionally an array, is optically coupled to the input and output ports.

Referring to FIG. 2a an embodiment of a front-end micro-optical component 105 for providing light having a known polarization is shown having a fibre tube 107, a microlens 112, and a birefringent element 114 for separating an input beam into two orthogonal polarized sub-beams. At an output end, a half waveplate 116 is provided to rotate the polarization of one of the beams by 90° so as to ensure both beams have a same polarization state e.g., horizontal. A glass plate or a second waveplate 118 is added to the fast axis path of the crystal 114 to lessen the effects of Polarization Mode Dispersion (PMD) induced by the difference in optical path length along the two diverging paths of crystal 114.

FIG. 2b illustrates an alternative embodiment to that of FIG. 2a, wherein two birefringent elements 114a, 114b have a half waveplate 116a disposed therebetween; here an alternate scheme is used to make the path lengths through the birefringent materials substantially similar. Optionally, a third waveplate 119 is provided for further rotating the polarization state.

Although, FIGS. 2a and 2b both illustrate a single input beam of light for ease of understanding, the front end unit 105 is capable of carrying many more beams of light therethrough, in accordance with the instant invention (i.e., can be designed as an array as described above).

FIGS. 3a–3b, 3c–3d, 4, and 5, each illustrate a different embodiment of the modifying means for use with the DGE/COADM devices described herein. Each of these embodiments is described in more detail below. Note that the modifying means are generally discussed with reference to FIG. 1. However, although reference is made to the dispersive element 120 and elements having optical power 110a and 110b, these optical components have been omitted from FIGS. 3a–3b, 3c–3d, 4, and 5 for clarity.

Figure 3A:
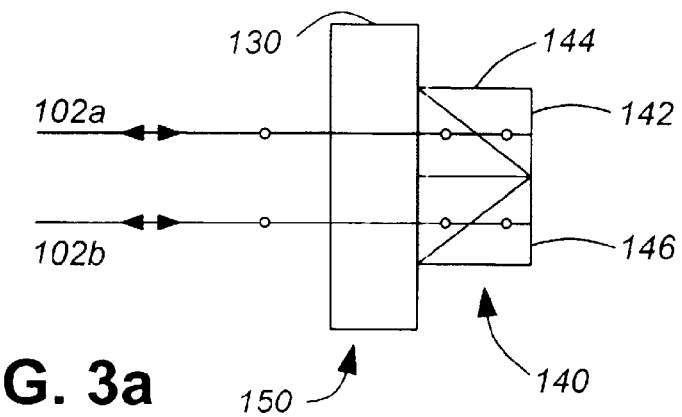
FIG. 3a is a top view of one embodiment of modifying means comprising a liquid crystal array for use with the DGE/COADM shown in FIG. 1, wherein a liquid crystal element is switched to an ON state.
Figure 3B:
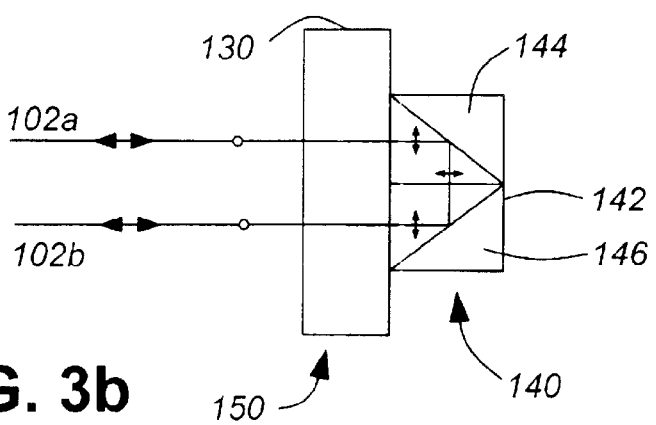
FIG. 3b is a top view of the modifying means shown in FIG. 3a, wherein the liquid crystal element is switched to an OFF state.

Referring to FIGS. 3a and 3b a schematic diagram of the modifying means 150 is shown including a liquid crystal array 130 and a reflector 140. The reflector includes first and second polarizing beam splitters 144 and 146, and reflective surface 142.

When the device operates as a COADM, each pixel of the liquid crystal array 130 is switchable between a first state e.g., an "ON" state shown in FIG. 3a, wherein the polarization of a beam of light passing therethrough is unchanged (e.g., remains horizontal), and a second state e.g., an "OFF" state shown in FIG. 3b, wherein the liquid crystal cell rotates the polarization of a beam of light passing therethrough 90° (e.g., is switched to vertical). The reflector 140 is designed to pass light having a first polarization (e.g., horizontal) such that beam of light launched from port 102a is reflected back to the same port, and reflect light having another polarization (e.g., vertical) such that a beam of light launched from port 102a is switched to port 102b.

When the device operates as a DGE, each liquid crystal cell is adjusted to provide phase retardations between 0 to 180°. For a beam of light launched and received from port 102a, 0% attenuation is achieved when liquid crystal cell provides no phase retardation and 100% attenuation is achieved when the liquid crystal cell provides 180° phase retardation. Intermediate attenuation is achieved when the liquid crystal cells provide a phase retardation greater than 0 and less than 180°. In some DGE applications, the reflector 140 includes only a reflective surface 142 (i.e., no beam splitter).

Preferably, the liquid crystal array 130 has at least one row of liquid crystal cells or pixels. For example, arrays comprising 64 or 128 independently controlled pixels have been found particularly practical, but more or fewer pixels are also possible. Preferably, the liquid crystal cells are of the twisted nematic type cells, since they typically have a very small residual birefringence in the "ON" state, and consequently allow a very high contrast ratio (>35 dB) to be obtained and maintained over the wavelength and temperature range of interest. It is also preferred that the inter-pixel areas of the liquid crystal array 130 are covered by a black grid.

Figure 3C:
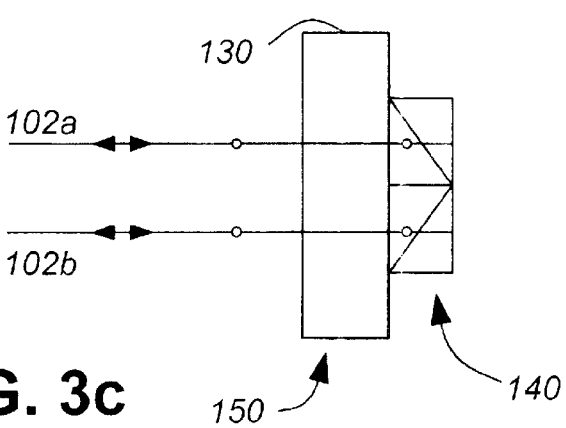
FIG. 3c is a top view of another embodiment of the modifying means for use with the DGE/COADM shown in FIG. 1, wherein the liquid crystal element is switched to an ON state.
Figure 3D:
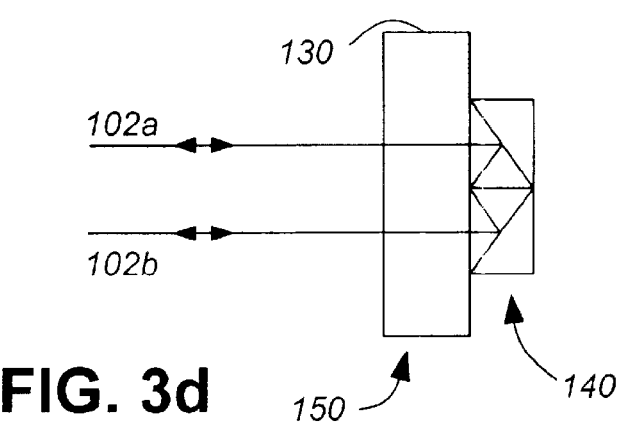
FIG. 3d is a top view of the modifying means shown in FIG. 3c, wherein the liquid crystal element is switched to an OFF state.

FIGS. 3c and 3d are schematic diagrams analogous to FIGS. 3a and 3b illustrating an alternate form of the modifying means 150 discussed above, wherein the reflector 140 includes a double Glan prism. The arrangement shown in FIGS. 3c and 3d is preferred over that illustrated in FIGS. 3a and 3b, since the respective position of the two-sub beams emerging from the polarization diversity arrangement (not shown) does not change upon switching.

Note that in FIGS. 3a–3d, the dispersion direction is perpendicular to the plane of the paper. For exemplary purposes a single ray of light is shown passing through the modifying means 150.

Figure 4A:
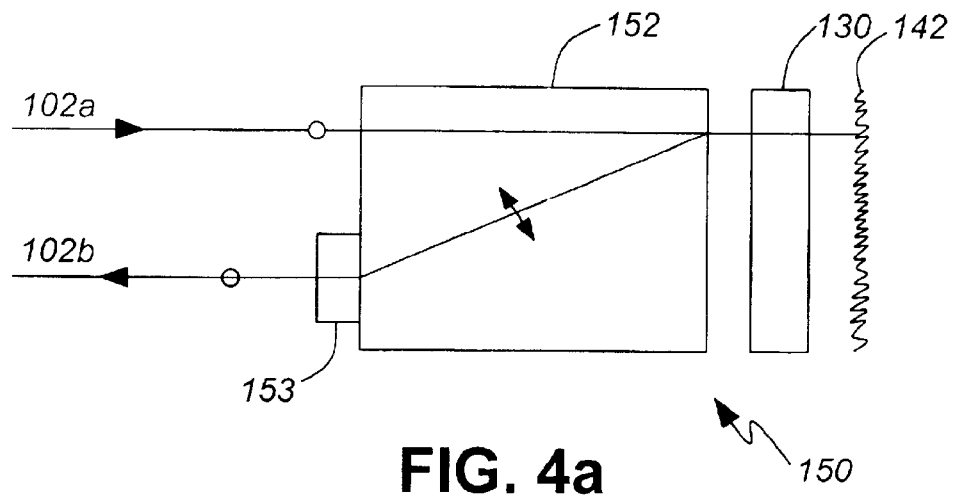
FIG. 4a is a top view of another embodiment of the modifying means for use with the DGE/COADM shown in FIG. 1 having a birefringent crystal positioned before the liquid crystal array, wherein the liquid crystal element is switched to an OFF state.
Figure 4B:
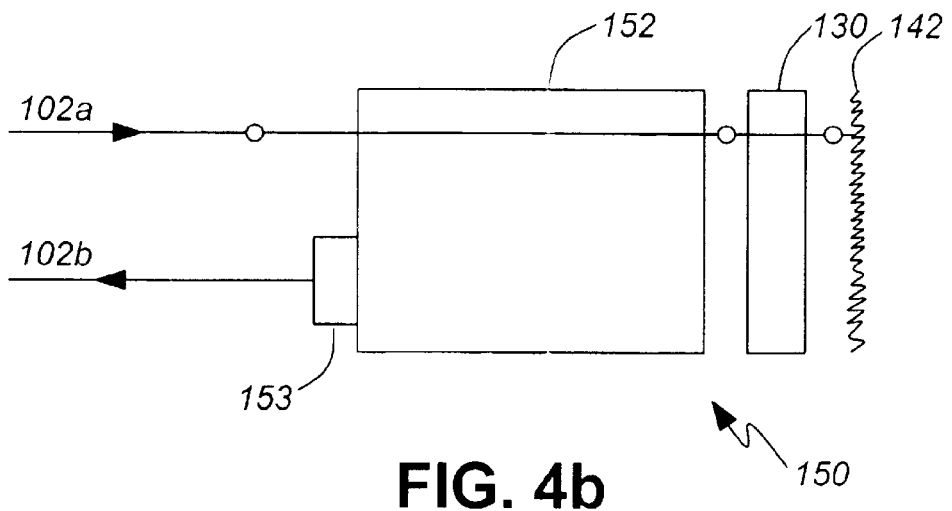
FIG. 4b is a top view of the modifying means shown in FIG. 4a, wherein the liquid crystal element is switched to an ON state.

FIGS. 4a and 4b are schematic diagrams showing another embodiment of the modifying means 150, wherein a birefringent crystal 152 is disposed before the liquid crystal array 130. A beam of light having a predetermined polarization state launched from port 102a is dispersed into sub-beams, which are passed through the birefringent crystal 152. The sub-beams of light passing through the birefringent crystal 152 remain unchanged with respect to polarization. The sub-beams of light are transmitted through the liquid crystal array 130, where they are selectively modified, and reflected back to the birefringent crystal 152 via reflective surface 142. If a particular sub-beam of light passes through a liquid crystal cell in an "OFF" state, as shown in FIG. 4a, then the polarization thereof will be rotated by 90° and the sub-beam of light will be refracted as it propagates through the birefringent crystal 152 before being transmitted to port 102b. If the sub-beam of light passes through a liquid crystal cell in an "ON" state, as shown in FIG. 4b, then the polarization thereof will not be rotated and the sub-beam of light will be transmitted directly back to port 102a. A half wave plate 153 is provided to rotate the polarization of the refracted sub-beams of light by 90° to ensure that both reflected beams of light have a same polarization state.

Figure 5:
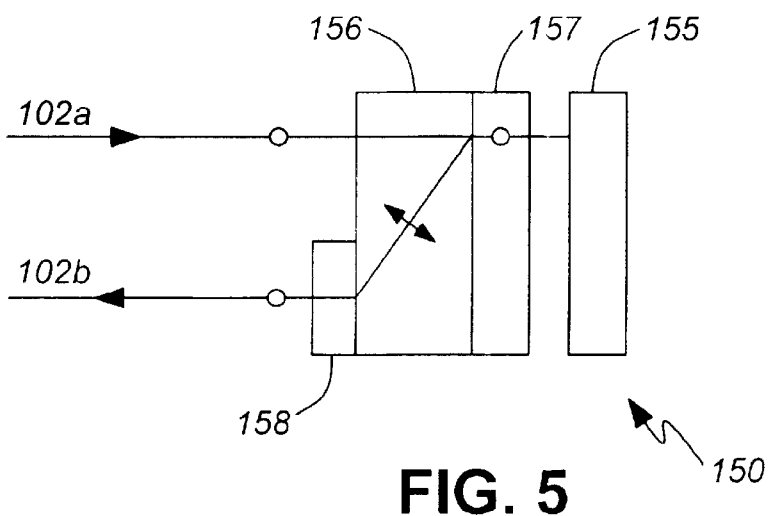
FIG. 5 is a top view of yet another embodiment of the modifying means for use with the DGE shown in FIG. 1 utilizing a MEMS device.

FIG. 5 is a schematic diagram of another embodiment of the modifying means 150 including a micro electromechanical switch (MEMS) 155, which is particularly useful when the device is used as a DGE. A beam of light having a predetermined polarization state launched from port 102a is dispersed into sub-beams and is passed through a birefringent element 156 and quarter waveplate 157. The birefringent element 156 is arranged not to affect the polarization of the sub-beam of light. After passing through the quarter waveplate 157, the beam of light becomes circularly polarized and is incident on a predetermined reflector of the MEMS array 155. The reflector reflects the sub-beam of light incident thereon back to the quarter waveplate. The degree of attenuation is based on the degree of deflection provided by the reflector (i.e., the angle of reflection). After passing through the quarter waveplate 157 for a second time, the attenuated sub-beam of light will have a polarization state that has been rotated 90° from the original polarization state. As a result the attenuated sub-beam is refracted in the birefringent element 156 and is directed out of the device to port 102b. A half wave plate 158 is provided to rotate the polarization of the refracted sub-beams of light by 90°.

Of course, other modifying means 150 including at least one optical element capable of modifying a property of at least a portion of a beam of light and reflecting the modified beam of light back in substantially the same direction from which it originated are possible.

Advantageously, each of the modifying means discussed above utilizes an arrangement wherein each spatially dispersed beam of light is incident thereon and reflected therefrom at a 90° angle. The 90° angle is measured with respect to a plane encompassing the array of modifying elements (e.g., liquid crystal cells, MEMS reflectors). Accordingly, each sub-beam of light follows a first optical path to the modifying means where it is selectively switched such that it is reflected back along the same optical path, or alternatively, along a second optical path parallel to the first. The lateral displacement of the input and modified output beams of light (i.e., as opposed to angular displacement) allows for highly efficient coupling between a plurality of input/output waveguides. For example, the instant invention is particular useful when the input and output ports are located on a same multiple bore tube, ribbon, or block.

In order to maintain the desired simplicity and symmetry, it is preferred that the element having optical power be rotationally symmetric, for example a rotationally symmetric lens or spherical reflector. Preferably, the spherical reflector is a concave mirror. Moreover, it is preferred that the diffraction element 120 be a high efficiency, high dispersion diffraction grating. Optionally, a circulator (not shown) is optically coupled to each of ports 102a and 102b for separating input/output and/or add/drop signals.

Referring again to FIG. 1, the operation of the optical device operating as a COADM is described by way of the following example. A collimated beam of light having a predetermined polarization and carrying wavelengths $\lambda_1, \lambda_2, \ldots \lambda_8$ is launched through port 102a to a lower region of lens 110a and is redirected to the diffraction grating 120. The beam of light is spatially dispersed (i.e., demultiplexed) according to wavelength in a direction perpendicular to the plane of the paper. The spatially dispersed beam of light is transmitted as 8 sub-beams of light corresponding to 8 different spectral channels having central wavelengths $\lambda_1, \lambda_2, \ldots \lambda_8$ through lens 110b, where it is collimated and incident on the modifying means 150, which for exemplary purposes, is shown in FIG. 3a–b. Each sub-beam of light is passed through an independently controlled pixel in the liquid crystal array 130. In particular, the sub-beam of light having central wavelength $\lambda_3$ passes through a liquid crystal cell in an "OFF" state, and each of the other 7 channels having central wavelengths $\lambda_1$–$\lambda_2$ and $\lambda_4$–$\lambda_8$ pass through liquid crystal cells in an "ON" state. As the sub-beam of light having central wavelength $\lambda_3$ passes through the liquid crystal in the "OFF" state, the polarization thereof is rotated 90°, it is reflected by the polarization beam splitter 144 towards a second beam splitter 146, and is reflected back to port 102b, as shown in FIG. 3b. As the other 7 channels having central wavelengths $\lambda_1$–$\lambda_2$ and $\lambda_4$–$\lambda_8$ pass through liquid crystal cells is in an "ON" state, the polarizations thereof remain unchanged, and they are transmitted through the polarization beam splitter 144 and are reflected off reflective surface 142 back to port 102a. In summary, the beam of light originally launched from port 102a will return thereto having dropped a channel (i.e., having central wavelength $\lambda_3$) and the sub-beam of light corresponding to the channel having central wavelength 3 will be switched to port 102b.

Simultaneously, a second beam of light having a predetermined polarization and carrying another optical signal having a central wavelength $\lambda_3$ is launched from port 102b to a lower region of lens 110a. It is reflected from the diffraction grating 120, and is transmitted through lens 110b, where it is collimated and incident on the modifying means 150. The second beam of light passes through the liquid crystal cell in the "OFF" state, the polarization thereof is rotated 90°, it is reflected by the second polarization beam splitter 146 towards the first beam splitter 144, and is reflected back to port 102a, as shown in FIG. 3b. Notably, the 7 express channels and the added channel are multiplexed when they return via the dispersion grating 120.

Since every spectral channel is passed through an independently controlled pixel before being reflected back along one of the two possible optical paths, a full reconfigurablility of plurality of channels is obtained.

Notably, the choice of eight channels is arbitrarily chosen for exemplary purposes. More or fewer channels are also within the scope of the instant invention.

Referring again to FIG. 1, the operation of the optical device operating as a DGE is described by way of the following example. A collimated beam of light having a predetermined polarization and carrying channels $\lambda_1, \lambda_2, \ldots$ $\lambda_8$ is launched from port 102a through lens 110a, where it is redirected to diffraction grating 120. The beam of light is spatially dispersed according to wavelength in a direction perpendicular to the plane of the paper. The spatially dispersed beam of light is transmitted as 8 sub-beams of light corresponding to 8 different spectral channels having central wavelengths $\lambda_1, \lambda_2, \ldots \lambda_8$ through lens 110b, where it is collimated and incident on the modifying means 150 such that each sub-beam of light is passed through an independently controlled pixel in the liquid crystal array 130 wherein the polarization of each sub-beam of light is selectively adjusted. In particular, the sub-beam of light having central wavelength $\lambda_3$ is passed through a liquid crystal cell in an "ON" state, the polarization thereof is not adjusted, it passes through the beam splitter 144, and is reflected back to port 102a with no attenuation, as illustrated in FIG. 3a. Simultaneously, a sub-beam of light having central wavelength $\lambda_4$ is passed through a liquid crystal cell in an "OFF" state, the polarization thereof is rotated by 90°, it is reflected from beam splitters 144 and 146 and is directed to port 102b. 100% attenuation is achieved with respect to this sub-beam of light returning to port 102a. Simultaneously, a sub-beam of light having central wavelength $\lambda_5$ is passed through a liquid crystal cell that provides phase retardation between 0 and 180°, it is partially transmitted through from beam splitter 144 and returns to port 102a an attenuated signal. The degree of attenuation is dependent upon the phase retardation.

Optionally, a second beam of light is simultaneously launched from port 102b into the optical device for appropriate attenuation. In fact, this optical arrangement provides a single optical system that is capable of providing simultaneous attenuation for a plurality of input ports, e.g., 102c, 102d, 102e, etc . . . (not shown).

Alternatively, the attenuated light is received from port 102b, hence obviating the need for a circulator. In this instance, when the polarization of a beam of light having central wavelength $\lambda_3$ is rotated by 90° (i.e., the liquid crystal array provides 180° phase retardation), it is reflected from the beam splitter 144 to the second beam splitter 146 (shown in FIG. 3a) and is directed to port 102b with no attenuation. Similarly, when the polarization of this beam of light is not adjusted (i.e., the liquid crystal array provides no phase retardation), it passes through the beam splitter 144 (shown in FIG. 3a) and is reflected back to port 102a. 100% attenuation with respect to this sub-beam of light reaching port 102b is achieved. Variable attenuation is achieved when the liquid crystal cell selectively provides phase retardation between 0 and 180°.

Figure 6A:
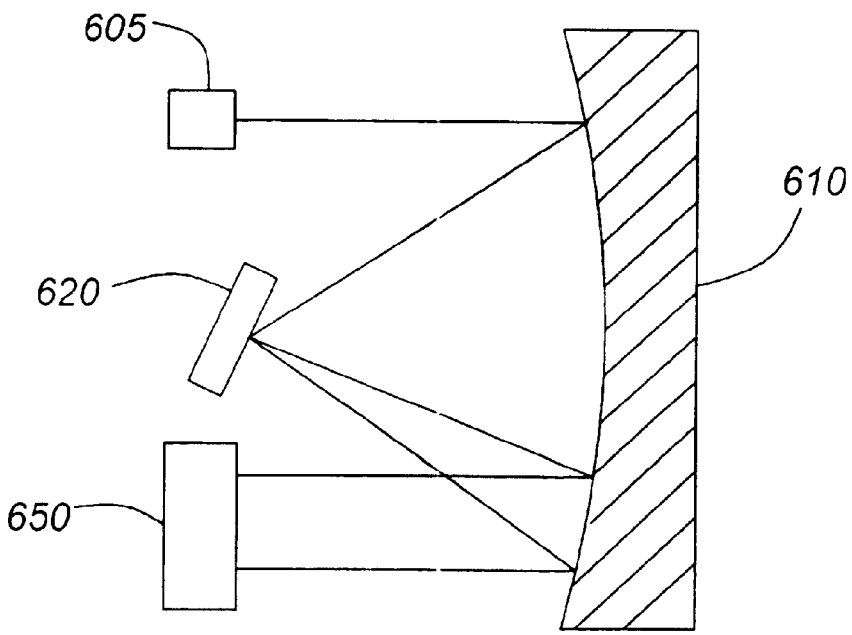
FIGS. 6a and 6b are schematic diagrams of an embodiment of the invention that is preferred over the one shown in FIG. 1, wherein the focal plane of a single concave reflector is used to locate the input/output ports, diffraction grating, and modifying means.

Turning now to FIG. 6a another embodiment of the DGE/COADM which is preferred over the embodiment shown in FIG. 1, is shown. For clarity, only one beam is shown exiting the front-end unit 605, however at least one other beam (not shown) is disposed behind this beam as is evident in the isometric view illustrated in FIG. 6b.

In FIG. 6a a single element having optical power in the form of a spherical reflector 610 is used to receive a collimated beam of light from the front-end unit 605 and to receive and reflect beams of light to and from the diffraction grating 620 and the modifying means 650. The front-end unit 605, the diffraction grating 620, and the modifying means 650, are similar to parts 105, 120, and 150 described above. However, in this embodiment the front-end unit 605, the diffraction grating 620, and the modifying means are each disposed about the single focal plane of the spherical reflector 610. Preferably, the diffraction grating is further disposed about the optical axis of the spherical reflector 610.

In general, two circulators (not shown) are optically coupled to the front-end unit 605 to separate input/out and add/drop signals in ports 102a and 102b, as described above.

Figure 6B:
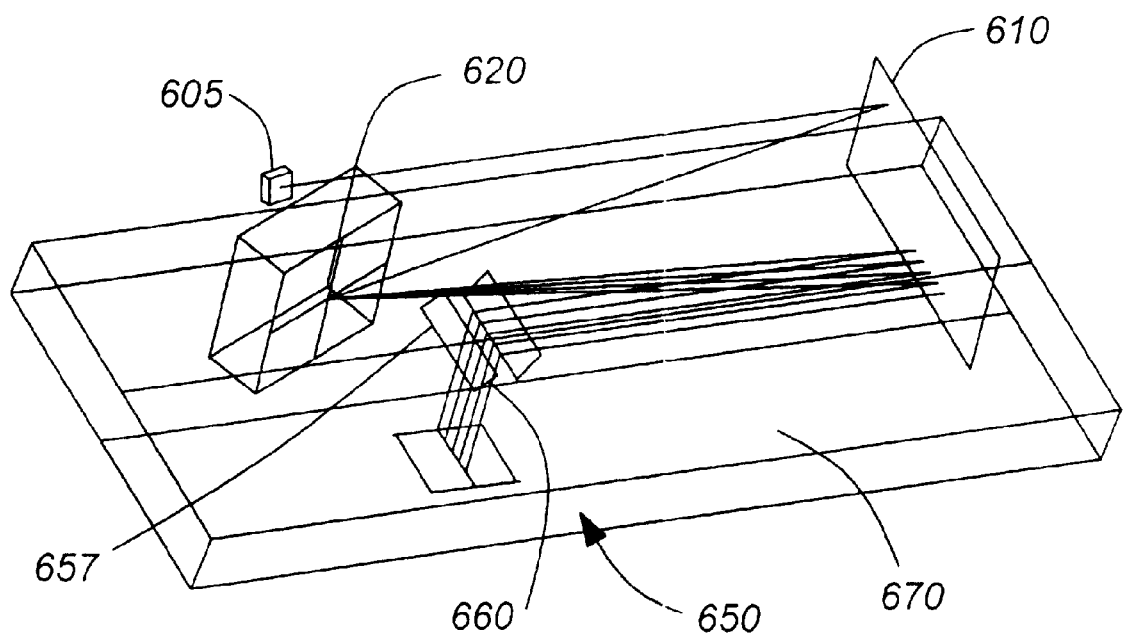

Preferably, the diffraction grating 620, the spherical reflector 640, and the modifying means 650 are each made of fused silica and mounted together with a beam folding mirror or prism 660 to a supporting plate 670 made of the same, as illustrated in FIG. 6b. The beam folding mirror or prism 660 is provided for space considerations. Advantageously, this design provides stability with respect to small temperature fluctuations. Moreover, this design is defocus free since the radius of curvature of the spherical reflector 610 changes in proportion to thermal expansion or contraction of any other linear dimensions. Advantageously, the spherical mirror 610 has substantially no chromatic aberrations.

When the optical device operates as a DGE, a detector array 657 is optionally positioned behind the beam-folding mirror 660 to intercept part of the wavelength dispersed beam of light. This design allows the signal to be tapped while eliminating the need for external feedback.

Preferably, the diffraction grating 620 and the modifying means 650 are disposed substantially one focal length away from the spherical mirror 610 or substantially at the focal plane of the spherical reflector 610, as discussed above. For example, in COADM applications it is preferred that the modifying means 650 are substantially at the focal A plane to within 10% of the focal length. For DGE applications, it is preferred that the modifying means 650 are substantially at the focal plane to within 10% of the focal length if a higher spectral resolution is required, however, the same accuracy is not necessary for lower resolution applications.

In operation, a multiplexed beam of light is launched into the front-end unit 605. The polarization diversity arrangement 105 provides two substantially collimated sub-beams of light having the same polarization (e.g., horizontal), as discussed above. The two beams of light are transmitted to the spherical reflector 610 and are reflected therefrom towards the diffraction grating 620. The diffraction grating 620 separates each of the two sub-beams into a plurality of sub-beams of light having different central wavelengths. The plurality of sub-beams of light are transmitted to the spherical reflector 610 where they are collimated and transmitted to the modifying means 150 where they are incident thereon as spatially separated spots corresponding to individual spectral channels. Each sub-beam of light corresponding to an individual spectral channel is modified and reflected backwards either along the same optical path or another optical path according to its polarization state, as described above. The sub-beams of light are transmitted back to the spherical reflector 610 and are redirected to the dispersive element, where they are recombined and transmitted back to the spherical element to be transmitted to the predetermined input/output port.

Optionally, second, third, forth, . . . etc. multiplexed beams of light are launched into the front-end unit 605. In fact, this optical arrangement is particularly useful for applications requiring the manipulation of two bands (e.g., C and L bands), simultaneously, wherein each band has its own corresponding in/out/add/drop ports.

Advantageously, the optical arrangement shown in FIGS. 6a and 6b provides a symmetrical 4-f optical system with fewer alignment problems and less loss than prior art systems. In fact, many of the advantages of this design versus a conventional 4f system using separate lenses is afforded due to the fact that the critical matching of components is obviated. One significant advantage relates to the fact that the angle of incidence on the grating, in the first and second pass, is inherently matched with the optical arrangement.

The instant invention further provides an optical device for rerouting and modifying an optical signal device that is substantially more compact and that uses substantially fewer components than similar prior art devices.

Figure 7:
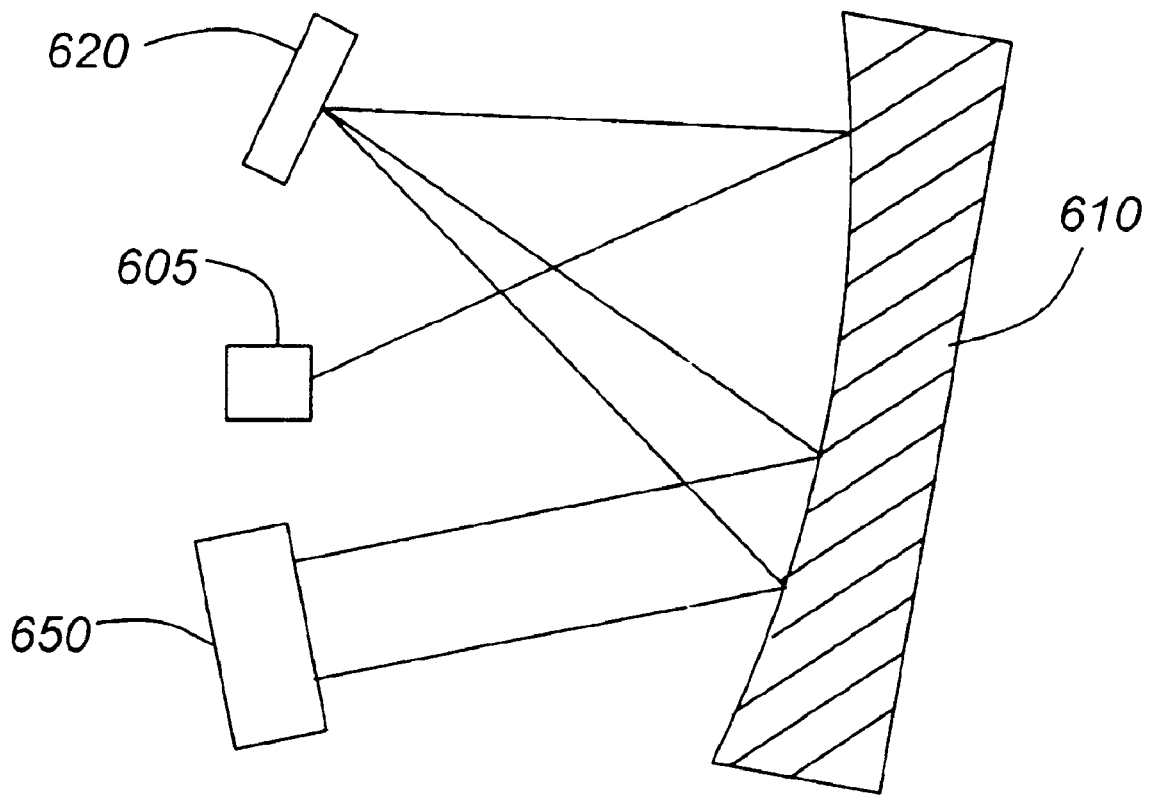
FIG. 7 is a schematic diagram of an embodiment of the invention that is similar to that shown in FIGS. 6a and 6b, wherein the input/output ports are disposed between the modifying means and dispersive element.

FIG. 7 shows an alternate arrangement of FIG. 6a and FIG. 6b that is particularly compact.

In this embodiment, the more bulky dispersive element 620 and modifying means 650 are disposed outwardly from the narrower front-end unit 605.

Figure 8:
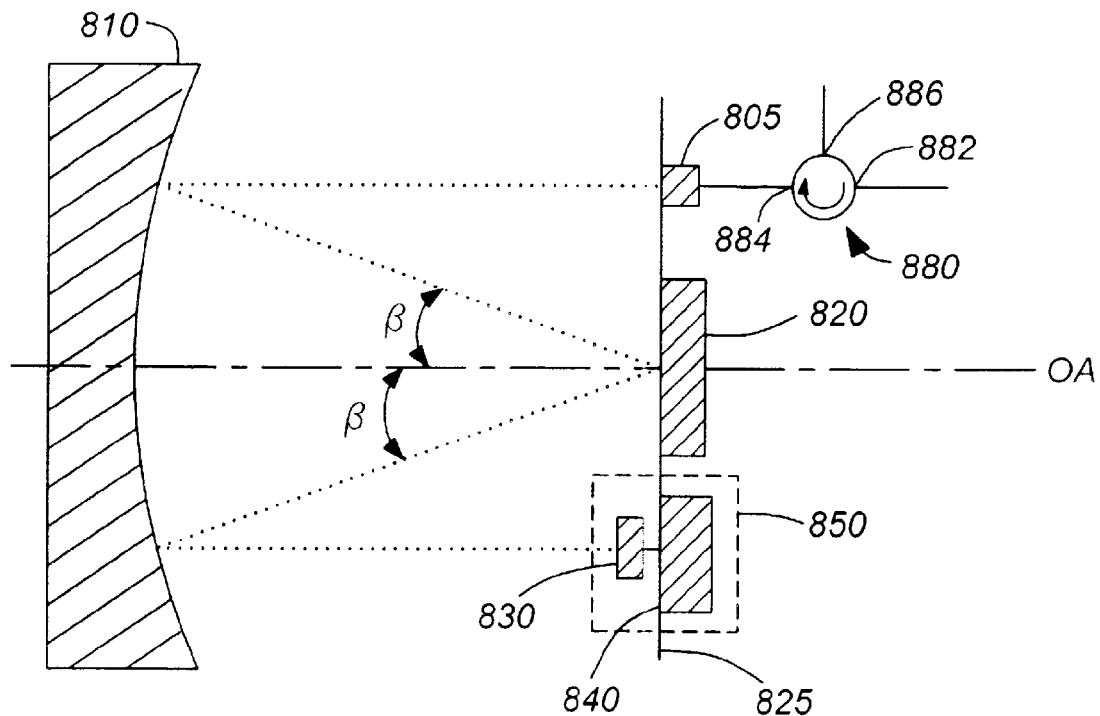
FIG. 8 is a schematic diagram of a DGE having a configuration similar to that shown in FIGS. 6a and 6b including an optical circulator.

FIG. 8 illustrates a DGE including a conventional three port optical circulator and having a particularly symmetrical design. A beam of light is launched into a first port 882 of the circulator 880 where it circulates to and exits through port 884. The beam of light exiting port 884 is passed through the front-end unit 805, which produces two collimated sub-beams having a same polarization that are transmitted to an upper region of the spherical reflector 810 in a direction parallel to an optical axis OA thereof. The collimated sub-beams of light incident on the spherical reflector 810 are reflected and redirected to the diffraction grating 820 with an angle of incidence β. The sub-beams of light are spatially dispersed according to wavelength and are transmitted to a lower region of the spherical reflector 810. The spatially dispersed sub-beams of light incident on the lower region of the spherical reflector 810 are reflected and transmitted to the modifying means 850 in a direction parallel to the optical axis of the spherical reflector 810. Once attenuated, the sub-beams of light are reflected back to the spherical reflector 810, the diffraction grating 820, and the front-end unit 805 along the same optical path. The diffraction grating recombines the two spatially dispersed sub-beams of light. The front-end unit 805 recombines the two sub-beams of light into a single beam of light, which is transmitted to the circulator 880 where it is circulated to output port 886. The front-end unit 805, diffraction grating 820, and modifying means 850, which are similar to components 105, 120, and 150 described above, are each disposed about a focal plane 825 of the spherical reflector 810. In particular, the diffraction grating 820 is disposed about the focal point of the spherical reflector 810 and the modifying means 850 and front-end unit are symmetrically disposed about the diffraction grating. Preferably, the modifying means 850 includes either a liquid crystal array 830 and a flat reflector 840, or a MEMS array (not shown).

Notably, an important aspect of the optical design described heretofore relates to the symmetry and placement of the optical components. In particular, the fact that each of the front-end unit, the element having optical power, the dispersive element, and the modifying means are disposed about one focal length (of the element having optical power) away from each other is particularly advantageous with respect to the approximately Gaussian nature of the incident beam of light.

Referring again to FIG. 8, the input beam of light emerges from the front-end unit 805 essentially collimated and is transmitted via the element having optical power 810 to the diffraction grating 820. Since the diffraction grating 820 is located at the focus of the element having optical power 810 and the input beams are collimated, the light is essentially focused on the diffraction grating 820, as discussed above. The $1/e^2$ spot size at the grating, $2\omega_1$, and the $1/e^2$ diameter $2\omega_2$ at the front-end unit 805, are related by:

$$\omega_1 * \omega_2 = \lambda f/\pi$$

where λ is wavelength and f is the focal length of the element having optical power. Accordingly, one skilled in the art can tune the spot size on the diffraction grating 820 and the resulting spectral resolution by changing the beam size at the front-end unit 805.

Moreover, the instant invention allows light beams launched from the front-end unit 805 to propagate to the liquid crystal array 830 with little or no spot expansion, since by symmetry, the spot size at the liquid crystal array is the same as the spot size at the front-end unit. Accordingly, the size of a beam of light launched from the front-end unit 805 can be changed to conform to the cell size of the liquid crystal array and/or vice versa. Alternatively, the size of the beam of light can be adjusted to change the spot size on the grating element 820, as discussed above. Obviously, the same tuning is achievable with the optical arrangements shown in both FIG. 1 and FIGS. 6a, 6b.

Figure 9:
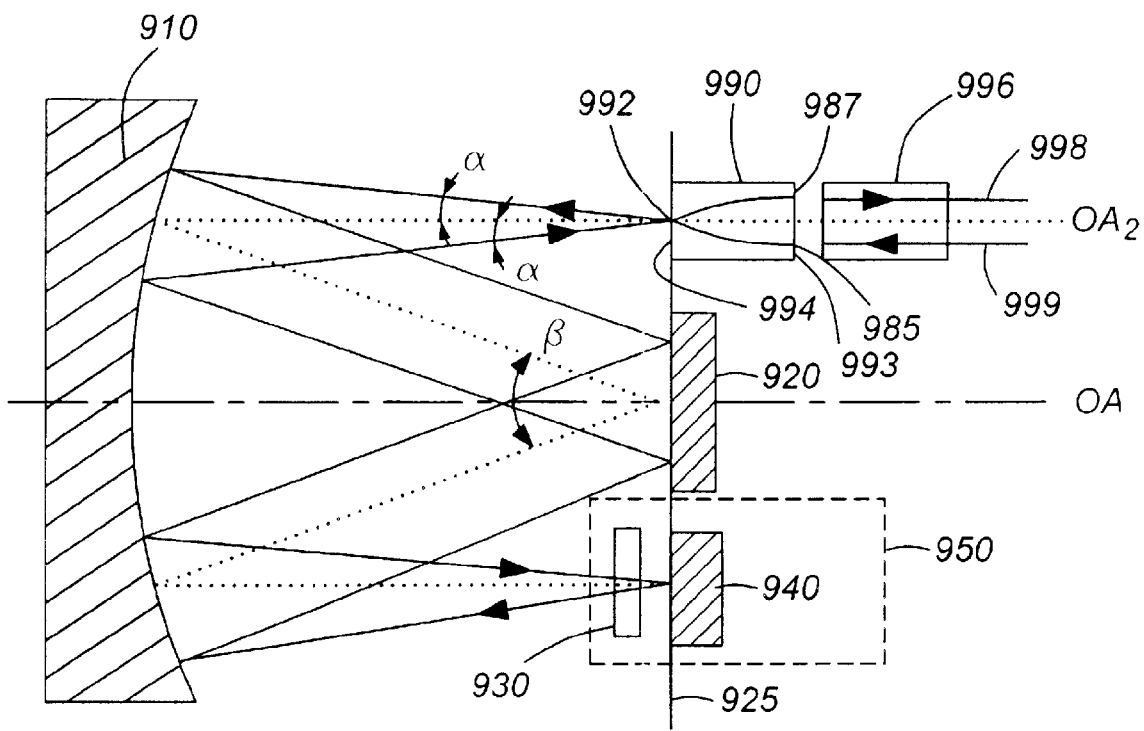
FIG. 9 is a schematic diagram of a DGE/COADM in accordance with the instant invention including a lens having a single port for launching and receiving light from the concave reflector.

FIG. 9 illustrates an embodiment in accordance with the instant invention, wherein a single collimating/focusing lens 990 replaces the optical circulator 884 in the DGE shown in FIG. 8. Preferably, the lens 990 is a collimating/focusing lens such as a Graded Index or GRIN lens. The GRIN lens 990 is disposed such that an end face 994 thereof is coincident with the focal plane 925 of the spherical reflector 910. The GRIN lens 990 is orientated such that its optical axis ($OA_2$) is parallel to but not coaxial with the optical axis OA of the spherical reflector 990. Input 985 and output 987 ports are disposed about an opposite end face 993 of the lens 990, off the optical axis $OA_2$, and are optically coupled to input 999 and output 998 optical waveguides, respectively. Preferably, input 999 and output 998 waveguides are optical fibres supported by a double fibre tube, such as a double bore tube or a double v-groove tube. A single input/output port 992 is disposed about end face 994 coincident with the optical axis $OA_2$. The modifying means 950 are shown including a liquid crystal array 930 and a flat mirror 940 perpendicular to the OA of the spherical reflector 910. Alternatively, the modifying means comprises a MEMS array (not shown). All other optical components are similar to those described with reference to FIG. 8.

In operation, a beam of light is launched from input waveguide 999 into port 985 in a direction substantially parallel to the optical axis ($OA_2$) of the lens 990. The beam of light passes through the GRIN lens 990, and emerges from port 992 at an angle α to the optical axis. The angle a is dependent upon the displacement of port 985 from the optical axis ($OA_2$), d. The beam of light is transmitted to an upper end of the spherical reflector 910, where it is directed to the diffraction grating 920 with an angle of incidence β. The resulting spatially dispersed beam of light is transmitted to the spherical reflector, is reflected, and is transmitted to the modifying means 950. If the diffraction grating 920 is parallel to the focal plane 925, as shown in FIG. 9, the beam of light incident on the modifying means has an angle of incidence substantially close to α. Each sub-beam of the spatially dispersed beam of light is selectively reflected back to the spherical reflector 910 at a predetermined angle, generally along a different optical path from which it came. Variable attenuation is provided by the modifying means 950. The spherical reflector 910 redirects the modified spatially dispersed beam of light back to the diffraction grating 920 such that it is recombined to form a single modified output beam of light, which is incident on the single port 992 with an angle of incidence close to −α. The attenuated output beam of light is passed through the lens 990, and is directed towards output port 987 where it is transmitted to output optical fibre 998.

Advantageously, this simple device, which allows light to enter and exit through two different ports disposed at one end of the device, is simple, compact, and easy to manufacture relative to prior art modifying and rerouting devices.

Moreover, the instant design obviates the need for a bulky and costly optical circulator, while simultaneously providing an additional degree of freedom to adjust the mode size, which in part defines the resolution of the device (i.e., can adjust the focal length of GRIN lens 990).

Preferably, light transmitted to and from the output 998 and input 999 optical waveguides is focussed/collimated, e.g., through the use of microcollimators, thermally expanded core fibres, or lens fibres. Optionally, a front-end unit (e.g., as shown in FIGS. 2a or 2b), which is in the form of an array, couples input/output waveguides 999/998 to end face 993. FIGS. 9a–9d illustrate various optical input arrangements, which for exemplary purposes are illustrated with the arrangement shown in FIG. 2a.

Figure 9A:
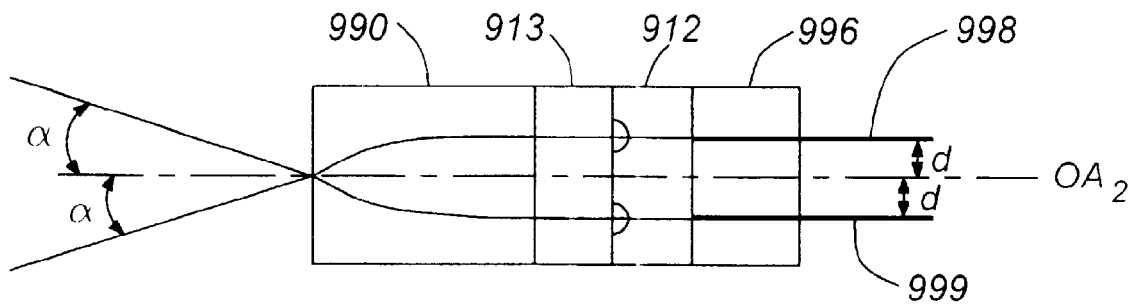
FIG. 9a is a top view showing a lenslet array coupling input/output optical waveguides to the lens in accordance with the instant invention.

In FIG. 9a, the input 999 and output 998 optical fibres are coupled to the GRIN lens 990 via a lenslet array 912. A spacer 913 is provided in accordance with the preferred telecentric configuration. This optical arrangement, which does not provide polarization diversity, is suitable for applications that do not involve polarization sensitive components.

Figure 9B:
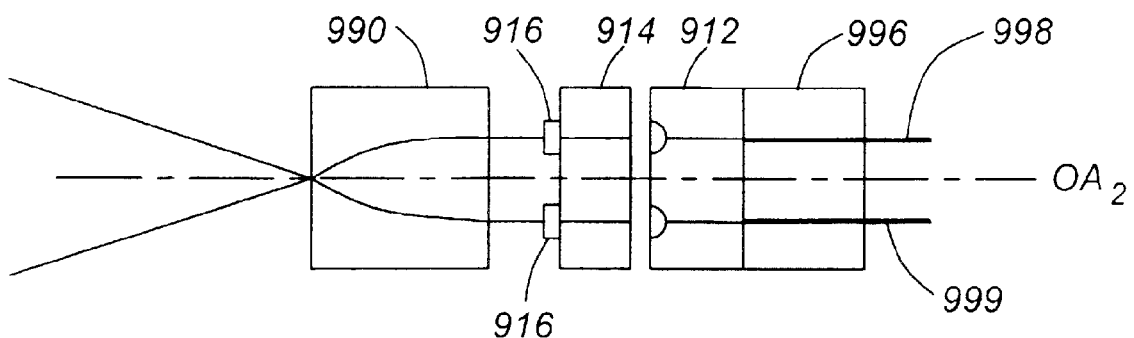
FIG. 9b is a top view showing a prior art polarization diversity arrangement coupling input/output optical waveguides to the lens in accordance with the instant invention.
Figure 9C:
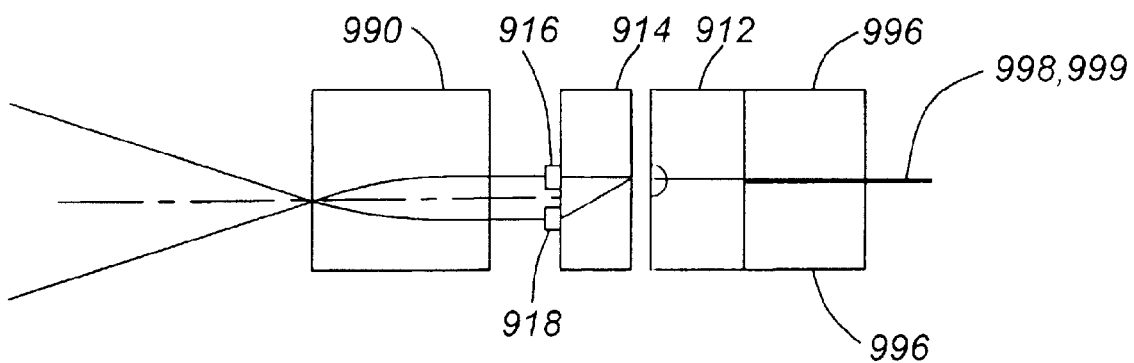
FIG. 9c is a side view of the prior art polarization diversity arrangement shown in FIG. 9b.

FIGS. 9b and 9c depict top and side views of the embodiment where a front-end unit (i.e., as shown in FIG. 2a), couples the input/output waveguides 999/998 to the GRIN lens 990. More specifically, the front-end unit includes sleeve 996, lenslet array 912, birefringent element 914, half waveplates 916, glass plates or second waveplates 918, and GRIN lens 990.

Figure 9D:
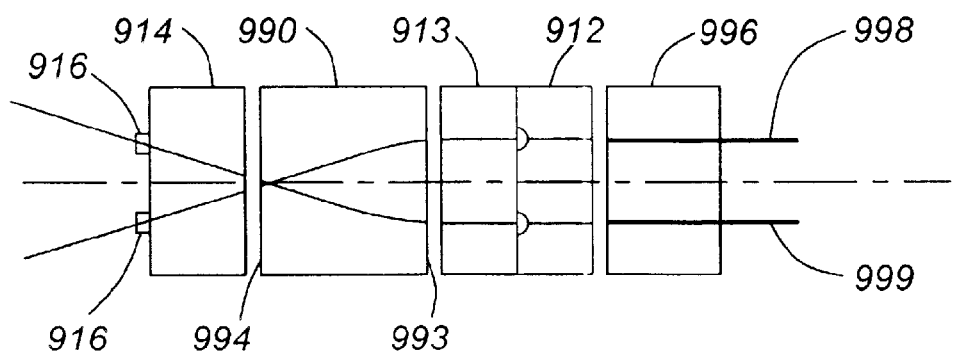
FIG. 9d is a top view showing an alternative arrangement to the optical components shown in FIG. 9b.
Figure 9E:
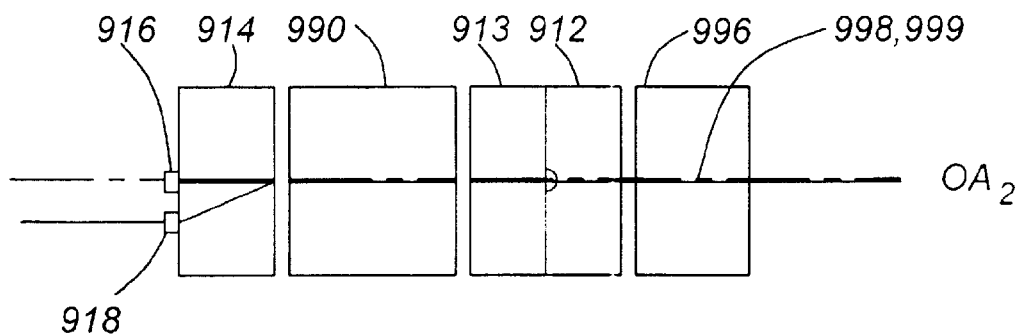
FIG. 9e is a side view of the alternate arrangement shown in FIG. 9d.

In FIGS. 9d and 9e there is shown top and side views of an arrangement wherein the birefringent element 914, half waveplates 916, and glass plates 918, which provide the polarization diversity, are disposed about end face 994 of GRIN lens 990 and a spacer 913 the lenslet array 112 are disposed about end face 993.

Figure 9F:
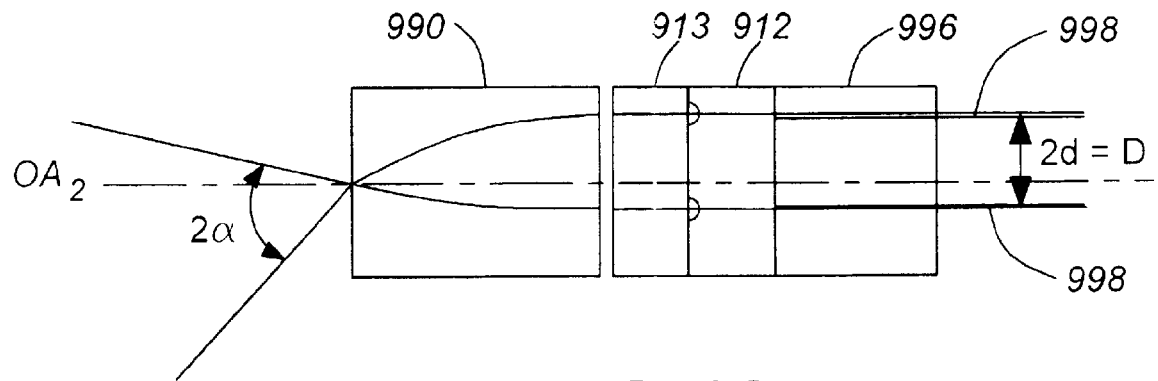
FIG. 9f is a top view showing an asymmetric offset of the input/output optical waveguides with respect to the optical axis of the lens, in accordance with the instant invention.

FIG. 9f illustrates an embodiment wherein the input 999 and output 998 optical waveguides are not symmetrically disposed about the optical axis $OA_2$ of the GRIN lens 990. In these instances, it is more convenient to compare the fixed distance between the input 999 and output 998 waveguides (D=2d) to the total angle between the input and output optical paths (2α). More specifically, the relationship is given approximately as:

$$\frac{D}{F} = 2\alpha$$

where F is the focal length of the GRIN lens 990.

Figure 10:
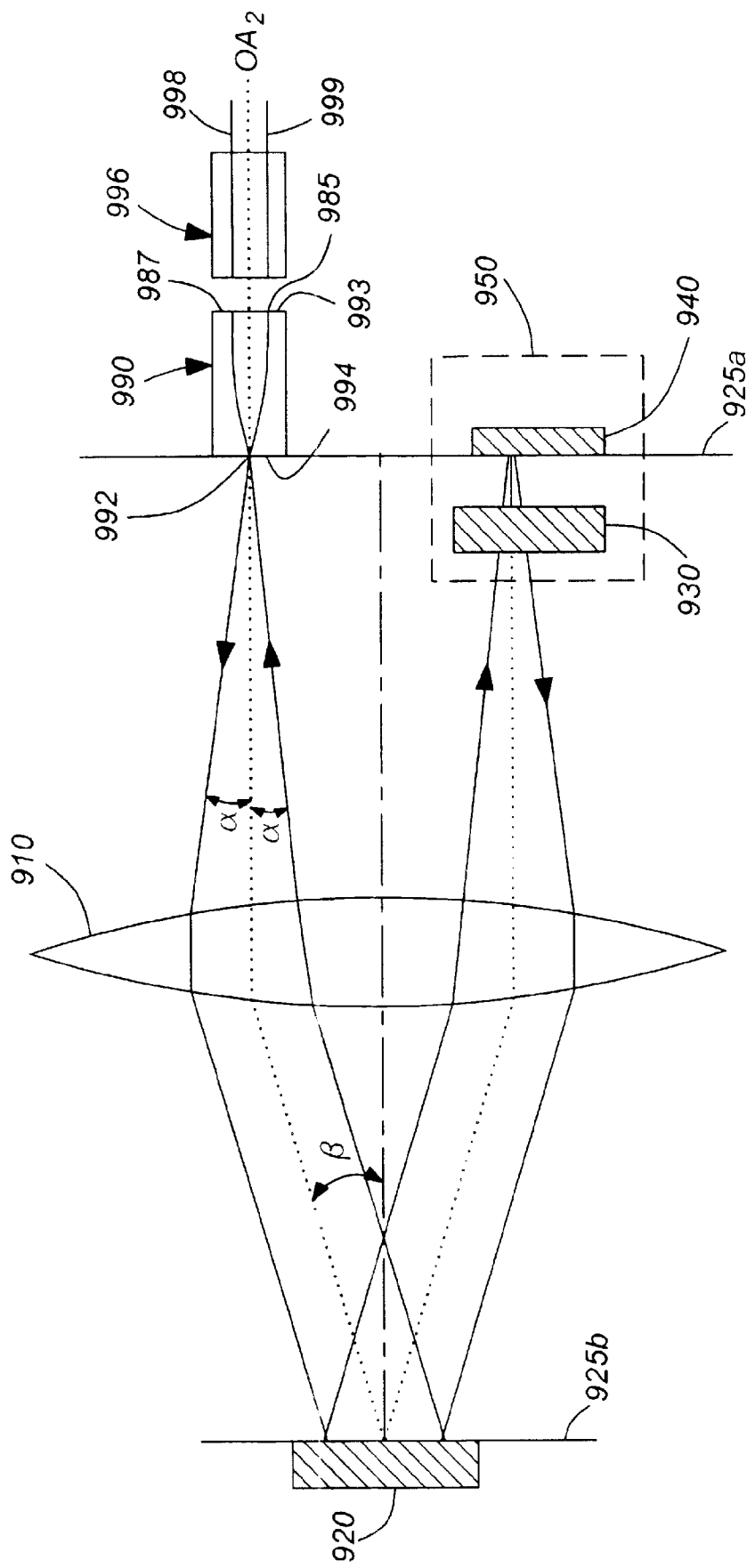
FIG. 10 is a schematic diagram of another embodiment of a DGE/COADM in accordance with the invention.

Of course other variations in the optical arrangement are possible. For example, in some instances, it is preferred that the diffraction grating 920 is disposed at an angle to the focal plane 925. In addition, the placement of the front end unit/lens 990, diffraction grating 920, and modifying means 950 can be selected to minimize aberrations associated with the periphery of the element having optical power 910. In FIG. 10, an alternative design of FIG. 9, wherein the element having optical power is a lens 910 having two focal planes 925a and 925b is illustrated. The diffraction grating 920 is coincident with focal plane 925b and the reflector 940 is coincident with focal plane 925a. The operation is similar to that discussed for FIG. 9.

An advantage of the embodiments including a GRIN lens 990, e.g. as shown in FIG. 9–9d is that they are compatible with modifying means based on MEMS technology, for both COADM and DGE applications. This is in contrast to the prior art optical arrangements described in FIGS. 1 and 6–8, wherein the MEMS based modifying means 150 are preferred for DGE applications over COADM applications.

In particular, when the single collimating/focusing lens 990 provides the input beam of light and receives the modified output beam of light, the angular displacement provided by each MEMS reflector complements the angular displacement resulting from the use of the off-axis input/output port(s) on the GRIN lens 990. More specifically, the angular displacement provided by the lens 990 e.g., α, is chosen in dependence upon the angular displacement of the MEMS device, e.g., 1°.

Figure 11:
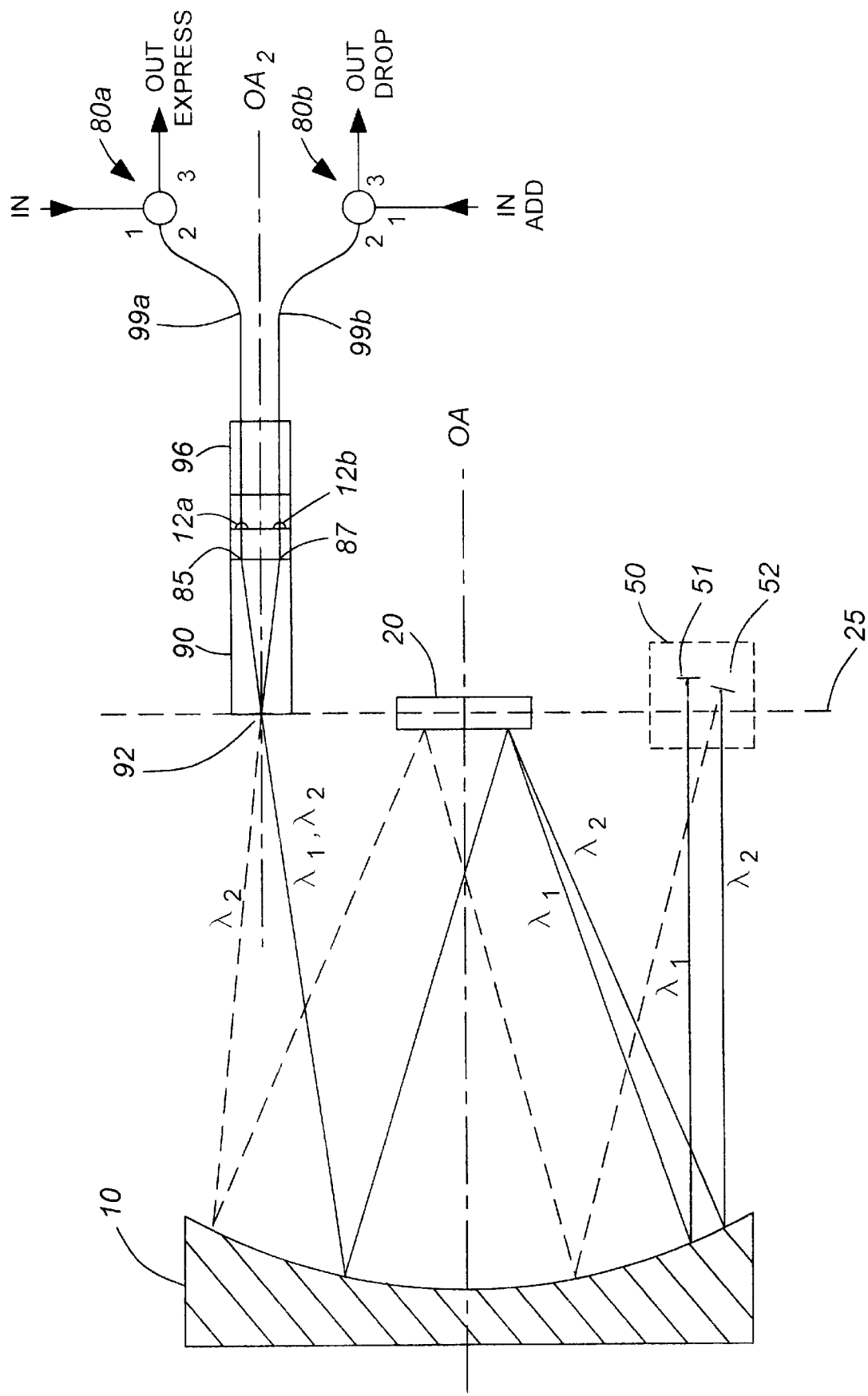
FIG. 11 is a schematic diagram of the preferred embodiment of a COADM in accordance with the instant invention; and, FIG. 12 is a schematic diagram of a COADM in accordance with the instant invention, wherein an asymmetric arrangement of the input/output optical waveguides complements the angular displacement provided by a MEMS element.

A preferred embodiment is illustrated in FIG. 11, wherein an arrangement similar to that shown in FIG. 9 designed to operate as a COADM, is shown. Optical circulators 80a and 80b are coupled to each of the optical waveguides 99a and 99b, respectively, for separating in/out and add/drop optical signals. Optical waveguides 99a and 99b are optically coupled to microlenses 12a and 12b disposed on one side of the lens 90.

The lens 90 is disposed such that an end thereof lies in the focal plane 25 of the spherical reflector 10. Also in the focal plane are the dispersive element 20 and the modifying means 50, as described above. However, in this embodiment, the modifying means is preferably a MEMS array 50. Notably, the MEMS array provides a 2×2 bypass configuration wherein an express signal launched into port 1 of the circulator 80a propagates to port 3 of the same circulator 80a in a first mode of operation and a dropped signal launched into port one of the circulator 80a propagates to port 3 of the second circulator 80b in a second mode of operation. Similarly, a signal added at port 1 of the second circulator device propagates to port 3 of the second circulator in the second mode of operation and is not collected in the first mode of operation. For exemplary purposes, the beam of light is assumed to include wavelengths $\lambda_1$ and $\lambda_2$, however, in practice more wavelengths are typically used.

In operation, the beam of light carrying wavelengths $\lambda_1$ and $\lambda_2$, is launched into port 1 of the first optical circulator 80a and is circulated to optical waveguide 99a supported by sleeve 96. The beam of light is transmitted through the microlens 12a to the lens 90, in a direction substantially parallel to the optical axis ($OA_2$) of the lens 90. The beam of light enters the lens through port 85 disposed off the optical axis ($OA_2$) and emerges from port 92 coincident with the optical axis ($OA_2$) at an angle to the optical axis ($OA_2$). The emerging beam of light $\lambda_1\lambda_2$, is transmitted to an upper portion of the spherical reflector 10, is reflected, and is incident on the diffraction grating 20, where it is spatially dispersed into two sub-beams of light carrying wavelengths $\lambda_1$ and $\lambda_2$, respectively. Each sub-beam of light is transmitted to a lower portion of the spherical reflector 10, is reflected, and is transmitted to separate reflectors 51 and 52 of the MEMS array 50. Referring to FIG. 11, reflector 51 is orientated such that the sub-beam of light corresponding to $\lambda_1$ incident thereon, is reflected back along the same optical path to the lens 90, passes through port 85 again, and propagates to port 2 of circulator 80a where it is circulated to port 3. Reflector 52, however, is orientated such that the sub-beam of light corresponding to $\lambda_2$ is reflected back along a different optical path. Accordingly, the dropped signal corresponding to wavelength $\lambda_2$ is returned to the lens 90, passes through port 87, propagates to port 2 of the second circulator 80b, and is circulated to port 3.

Simultaneously, a second beam of light having central wavelength $\lambda_2$ is added into port 1 of the second optical circulator 80b and is circulated to optical waveguide 99b. The second beam of light $\lambda_2$ is transmitted through the microlens 12b to the lens 90, in a direction substantially parallel to the optical axis ($OA_2$) of the lens 90. It enters the lens 90 through port 87 disposed off the optical axis ($OA_2$) and emerges from port 92 coincident with the optical axis ($OA_2$) at an angle to the optical axis. The emerging beam of light is transmitted to an upper portion of the spherical reflector 10, is reflected, and is incident on the diffraction grating 20, where it is reflected to reflector 52 of the MEMS array 50. Reflector 52 is orientated such that the second beam of light corresponding to $\lambda_2$ is reflected back along a different optical path to the spherical reflector 10, where it is directed to the diffraction grating. At the diffraction grating, the added optical signal corresponding to $\lambda_2$ is combined with the express signal corresponding to $\lambda_1$. The multiplexed signal is returned to the lens 90, passes through port 85, and returns to port 2 of the first circulator 80a where it is circulated out of the device from port 3.

Figure 12:
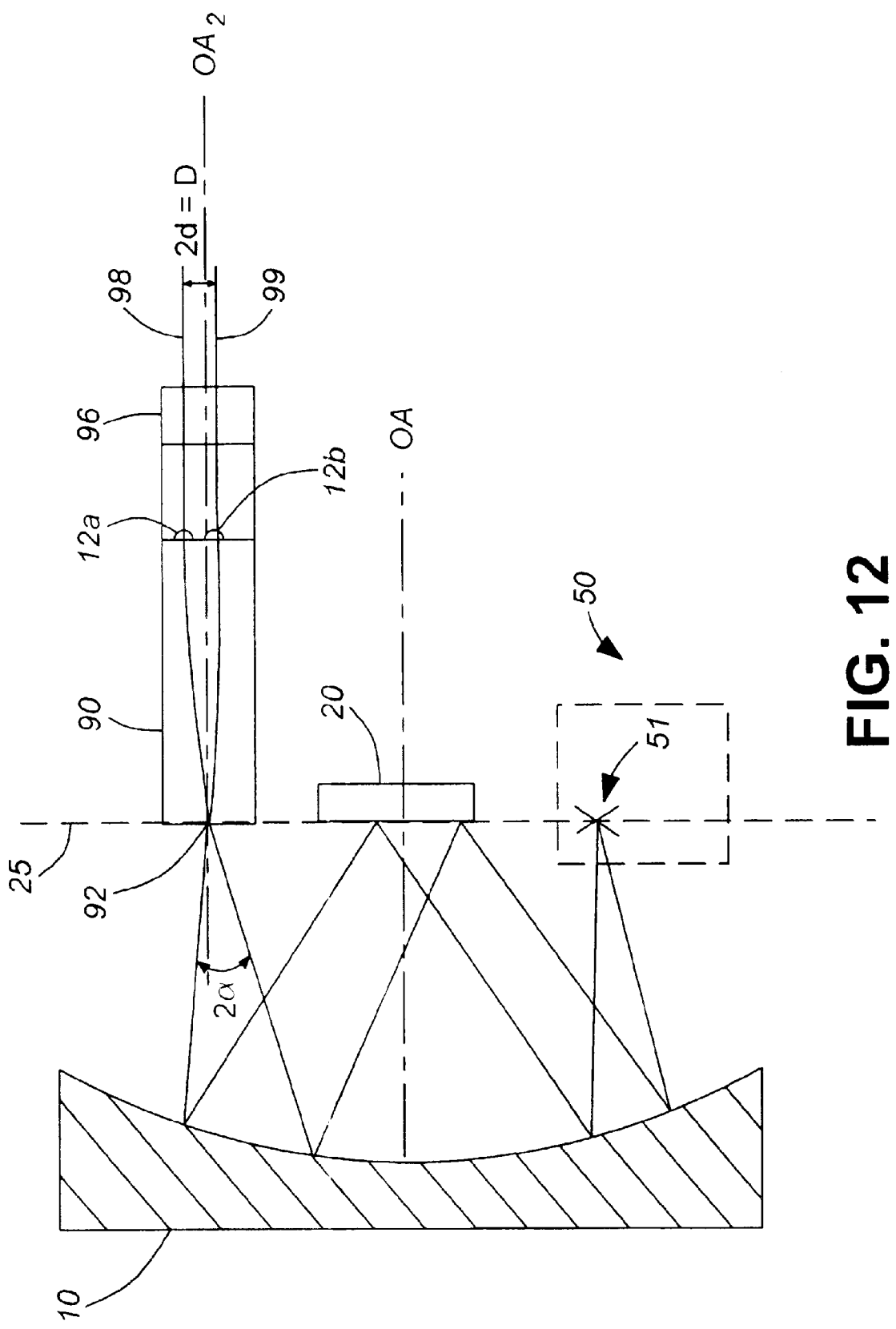

Of course, numerous other embodiments may be envisaged, without departing from the spirit and scope of the invention. For example, in practice it is preferred that each reflector of the MEMS array is deflected between positions non-parallel to focal plane 25 i.e., the deflection is not equivalent to the 45° and 0° deflections illustrated heretofore. In these instances, it is preferred that the optical waveguides coupled to the lens 90 be asymmetrically disposed about the optical axis $OA_2$, as illustrated in FIG. 9d. For example, FIG. 12 illustrates how strategic placement of the optical waveguides 99 and 98 can complement the angular displacement provided by the MEMS reflector 51. Moreover, it is also within the scope of the instant invention for the MEMs array to flip in either a horizontal or vertical direction, relative to the dispersion plane. Furthermore, any combination of the above embodiments and/or components are possible.

What is claimed is:

1. An optical device comprising:

a first port for launching a beam of light;

first redirecting means disposed substantially one focal length away from the first port for receiving the beam of light, the first redirecting means having optical power;

a dispersive element disposed substantially one focal length away from the first redirecting means for dispersing the beam of light into a plurality of sub-beams of light;

second redirecting means disposed substantially one focal length away from the dispersive element for receiving the dispersed beam of light, the second redirecting means having optical power; and, modifying means optically disposed substantially one focal length away from the second redirecting means for selectively modifying each sub-beam of light and for reflecting each of the modified sub-beams back to the second redirecting means, wherein each sub-beam of light is incident on and reflected from the modifying means along substantially parallel optical paths;

wherein the first and second redirecting means comprise a same concave mirror.

2. An optical device as defined in claim 1, wherein the dispersive element is a diffraction grating.

3. An optical device as defined in claim 1, comprising a front-end unit optically coupled to the first port comprising:

a microlens for collimating an input beam of light;

a birefringent crystal having an end coupled to the microlens for splitting the input beam of light into two orthogonally polarized beams of light; and, a half waveplate disposed about an opposite end of the birefringent crystal for rotating the polarization of one of the two orthogonally polarized beams of light by 90° such that both have a same polarization.

4. An optical device as defined in claim 1, comprising a front-end unit optically coupled to the first port comprising:

a microlens for collimating an input beam of light;

a first birefringent crystal having a first end coupled to the microlens for splitting the input beam of light into first and second orthogonally polarized beams of light;

a half waveplate having a first end coupled to a second end of the first birefringent crystal for rotating the polarization each of the first and second orthogonally polarized beams of light by 90°; and a second birefringent crystal coupled to a second end of the half waveplate for redirecting the first and second beams of light such that they have equal path lengths.

5. An optical device comprising:

a first port for launching a beam of light;

first redirecting means disposed substantially one focal length away from the first port for receiving the beam of light, the first redirecting means having optical power;

a dispersive element disposed substantially one focal length away from the first redirecting means for dispersing the beam of light into a plurality of sub-beams of light;

second redirecting means disposed substantially one focal length away from the dispersive element for receiving the dispersed beam of light, the second redirecting means having optical power; and, modifying means optically disposed substantially one focal length away from the second redirecting means for selectively modifying each sub-beam of light and for reflecting each of the modified sub-beams back to the second redirecting means, wherein each sub-beam of light is incident on and reflected from the modifying means along substantially parallel optical paths;

wherein the modifying means comprises a liquid crystal array and a reflector.

6. An optical device as defined in claim 5, wherein the reflector comprises a reflective surface and at least one polarizing beam splitter.

7. An optical device as defined in claim 5, wherein the reflector comprises a double Glan prism.

8. An optical device as defined in claim 5, wherein the modifying means comprises a birefringent element disposed on a front side of the liquid crystal array.

9. An optical device as defined in claim 1, wherein the dispersive element, the concave mirror, and the modifying means are constructed from fused silica and mounted on a fused silica supporting plate.

10. An optical device as defined in claim 9, comprising a beam-folding mirror for redirecting the plurality of sub-beams of light from the concave mirror to the modifying means.

11. An optical device as defined in claim 10, comprising a detector array disposed behind the beam-folding mirror for intercepting and detecting at least a portion of the plurality of sub-beams of light.

12. An optical device for rerouting and modifying an optical signal comprising:

a lens including a first end having a single port coincident with an optical axis thereof and a second end having two ports disposed off the optical axis;

an element having optical power disposed about one focal length away from the lens for receiving a beam of light launched from the single port;

a dispersive element disposed about one focal length away from the element having optical power for spatially dispersing a beam of light received therefrom; and modifying means optically disposed about two focal lengths away from the dispersive element for modifying and reflecting a beam of light spatially dispersed by the dispersive element, wherein said one focal length is a focal length of the element having optical power.

13. An optical device for rerouting and modifying an optical signal as defined in claim 12, wherein the position of each of the two ports is related to an angular displacement of input and output beams of light to and from the modifying means, respectively.

14. An optical device for rerouting and modifying an optical signal as defined in claim 13, wherein the element having optical power is a concave mirror having a focal plane.

15. An optical device for rerouting and modifying an optical signal as defined in claim 14, wherein the lens, the dispersive element, and the modifying means are disposed substantially at the focal plane of the concave mirror.

16. An optical device for rerouting and modifying an optical signal as defined in claim 15, wherein the dispersive element is disposed about an optical axis of the element having optical power.

17. An optical device for rerouting and modifying an optical signal as defined in claim 15, wherein the lens is a GRIN lens.

18. An optical device for rerouting and modifying an optical signal as defined in claim 17, wherein the dispersive element is a diffraction grating.

19. An optical device for rerouting and modifying an optical signal as defined in claim 18, wherein the lens is arranged such that its optical axis is parallel but not coincident with the optical axis of the concave mirror.

20. An optical device for rerouting and modifying an optical signal as defined in claim 18, wherein the lens is arranged such that its optical axis is non-parallel to the optical axis of the element having optical power.

21. An optical device for rerouting and modifying an optical signal as defined in claim 18, wherein the modifying means comprises a liquid crystal array and a reflector.

22. An optical device for rerouting and modifying an optical signal as defined in claim 18, wherein the modifying means comprises a MEMS array.

23. An optical device for rerouting and modifying an optical signal as defined in claim 22, wherein the position of each of the two ports is selected in dependence upon a reflection angle provided by the MEMS array.

24. An optical device comprising:

a first port for launching a beam of light including a plurality of wavelength channels;

first redirecting means for receiving the beam of light, the first redirecting means having optical power;

a dispersive element for dispersing the beam of light into the plurality of wavelength channels;

second redirecting means for receiving the dispersed wavelength channels, the second redirecting means having optical power; and modifying means for reflecting at least a portion of at least one of the wavelength channels back to a second port via the second redirecting means, the dispersive element and the first redirecting means;

wherein the first redirecting means and the second redirecting means comprise a single element having optical power.

25. The optical device according to claim 24, wherein the single element having optical power comprises a single spherical mirror.

26. The optical device according to claim 24, wherein the dispersive element is a diffraction grating.

27. An optical device comprising:

a first port for launching a beam of light including a plurality of wavelength channels;

first redirecting means for receiving the beam of light, the first redirecting means having optical power;

a dispersive element for dispersing the beam of light into the plurality of wavelength channels;

second redirecting means for receiving the dispersed wavelength channels, the second redirecting means having optical power; and modifying means for reflecting at least a portion of at least one of the wavelength channels back to a second port via the second redirecting means, the dispersive element and the first redirecting means;

wherein the modifying means includes an array of liquid crystal cells for rotating the polarizations of a selected number of wavelength channels by desired amounts.

28. The optical device according to claim 27, wherein the modifying means also includes a polarization beam splitter for directing the wavelength channels according to their polarization.

29. The optical device according to claim 28, further comprising a third port for outputting a selected number of wavelength channels; wherein the liquid crystal arrays rotate a selected number of wavelength channels from a first polarization to a second polarization forming a set of dropped wavelength channels, while leaving a set express wavelength channels substantially unaffected; and wherein the polarizing beam splitter directs the express wavelength channels with the first polarization back to the second port and directs the dropped wavelength channels with the second polarization back to the third port.

30. The optical device according to claim 29, further comprising a fourth port for launching at least one wavelength channel with the same wavelength as one of the dropped wavelength channels for combining with the set of express wavelength channels.

31. The optical device according to claim 30, further comprising a lens for directing light traveling along a first path to a first circulator, which includes the first and second ports, and for directing light traveling along a second path to a second circulator, which includes the third and fourth ports.

32. The optical device according to claim 28, wherein the liquid crystal array rotates a selected number of wavelength channels by less than 90° and have substantially no effect on any remaining wavelength channels; and wherein the polarizing beam splitter directs a portion of the selected wavelength channels back to the second port along with the remaining wavelength channels.

33. The optical device for rerouting and modifying an optical signal as defined in claim 12, wherein the dispersive element disperses a beam of light into a plurality of wavelength channels, and directs the plurality of wavelength channels towards the element having optical power for redirection to the modifying means.

34. The optical device for rerouting and modifying an optical signal as defined in claim 33, wherein at least a portion of at least two of the wavelength channels are redirected back to the dispersive element via the element having optical power for recombination into a recombined optical signal; and wherein the recombined optical signal is directed to the single port via by the element having optical power.

35. A method of rerouting and modifying an optical signal comprising the steps of:
   a) launching a beam of light from an input/output port towards an element having optical power off an optical axis thereof;
   b) redirecting the beam of light with the first element having optical power to a dispersive element;
   c) spatially dispersing the redirected beam of light into a plurality of sub-beams of light corresponding to a plurality of different spectral channels with the dispersive element;
   d) redirecting the sub-beams of light with the element having optical power to a modifying means;
   e) selectively modifying at least one of the sub-beams of light, and reflecting them back towards the element having optical power;
   f) redirecting the selectively modified sub-beams with the element having optical power to the dispersive element;
   g) combining the selectively modified sub-beams to form a single output beam of light; and
   h) redirecting the output beam of light with the element having optical power to the input/output port.

36. The method according to claim 35, wherein the element having optical power is a spherical mirror.

37. (new) The method according to claim 36, wherein the input/output port, the dispersive element, and the modifying means are each positioned one focal length away from the spherical mirror.

38. The method according to claim 35, wherein step e) includes modifying a selected number of the plurality of sub-beams using an array of liquid crystal cells.

39. The method according to claim 38, wherein step e) includes rotating the polarization of the selected number of the plurality of sub-beams from a first polarization to a second polarization, while leaving any remaining sub-beams substantially unaffected;
   wherein step f) includes directing the selected number of the sub-beams to a first part of the dispersive element, while directing any remaining sub-beams to a second part of the dispersive element;
   wherein step g) includes combining the selected number of the sub-beams forming the output beam of light, and combining any remaining sub-beams into a return beam of light; and
   wherein step h) includes redirecting the output beam of light to an output port, and redirecting the return beam of light to the input/output port.

40. The method according to claim 39, wherein step a) includes launching the beam of light from an input port on a first side of a lens, and out the input/output port on a second side of the lens; wherein step h) includes receiving the output beam of light in the input/output port, and directing the output beam of light out the output port on the first side of the lens; and wherein step h) also includes receiving the return beam of light in the input/output port, and directing the return beam of light out the input port.

41. The method according to claim 38, wherein step e) also includes:
   independently rotating the polarization of a selected number of the plurality of sub-beams, whereby each of the selected number of sub-beams is defined by a first component and a second component; and
   passing the plurality of sub-beams through a polarization beam splitter for separating the first component from the second component;
   wherein step f) includes redirecting all of the plurality of sub-beams with the element having optical power to the dispersive element; and
   wherein step g) includes combining all of the plurality of sub-beams to form a single output beam.

* * * * *